United States Patent [19]
Cassidy

[11] 3,872,831
[45] Mar. 25, 1975

[54] SANITATION DEVICE
[76] Inventor: Andrew J. Cassidy, 727 Alfred Cres., Kingston, Ontario, Canada
[22] Filed: May 4, 1973
[21] Appl. No.: 350,124

[30] Foreign Application Priority Data
Apr. 20, 1972 Canada .............................. 140105

[52] U.S. Cl. ........................ 119/1, 248/101, 294/55
[51] Int. Cl. ........................................... A01k 29/00
[58] Field of Search ....... 119/1; 43/11, 12; 294/1 R, 294/19 R, 55; 15/257.1, 257.6; 248/99-101

[56] References Cited
UNITED STATES PATENTS

| | | | |
|---|---|---|---|
| 2,062,023 | 11/1936 | Gosselin | 248/99 |
| 3,522,922 | 8/1970 | Byron et al. | 248/101 |
| 3,614,041 | 10/1971 | Koger | 248/101 X |
| 3,659,891 | 5/1972 | Pettenon | 119/1 X |
| 3,679,125 | 7/1972 | Forance et al. | 248/99 X |
| 3,688,483 | 9/1972 | Hamilton | 294/55 |

Primary Examiner—Louis G. Mancene
Assistant Examiner—J. N. Eskovitz
Attorney, Agent, or Firm—Stevens, Davis, Miller & Mosher

[57] ABSTRACT

A portable sanitation device for collecting fecal matter particularly from dogs, including a short annular member having an upstanding rim over which may be folded the outer edge portion of a disposable bag, the main part of which bag extends within the annular member, releasable clip means being provided for retaining the edge portion of the bag. The device also includes a hinged lid which normally closes the top of the bag, and a long handle allowing a person standing upright to hold the annular member near the ground so that the bag is positioned to receive directly the stool of a dog. The bag protects the device from any contact with the fecal matter, and may be released from the device and dropped into a garbage container without the bag being touched by the hand.

4 Claims, 5 Drawing Figures

SANITATION DEVICE

The present invention relates to a portable sanitation device for collecting the fecal matter or stool of animals such as dogs.

The device of this invention is intended to be used outdoors by persons walking their dogs, and provides means by which the stool or droppings of the dog may easily be collected in a sanitary manner and carried home for later disposal in a suitable garbage container.

It has been recognized for some time that dog droppings represent a serious environmental problem particularly in large cities. For example, it has been estimated that in New York city about 110,000 pounds of dog stool are deposited every day on sidewalks, streets, parks and playgrounds. It has been reported that in New York city, vigilante groups are forming to protest against those people who use streets and other places as outdoor toilets for their dogs. In New York state, bills are being introduced in both the state legislature and the New York city council by the Environmental Protection Agency, requiring dog owners to clean up the droppings from their dogs. It is to be expected that with the present concern for the environment, many cities will be enforcing stricter regulations to the same effect.

Various devices have been patented and marketed which allow dog owners to scoop up the droppings which have been deposited on the ground. Examples of such devices are shown in U.S. Pat. No. 3,281,178 to Fisher (issued Oct. 25, 1966), and in U.S. Pat. No. 3,431,008 to Narita (issued Mar. 4, 1969). Such devices however are apt to leave quite a considerable amount of dirt on the ground, particularly if the surface of the ground is not smooth for example as with grass. Also, some of such devices appear to require the use of two hands to operate them, and thus are awkward to use when it is required at the same time to control a dog on a leash. Additionally, such devices generally need to be emptied between each use.

U.S. Pat. No. 3,052,214 to Johnson (issued Sept. 4, 1962) shows a device which is intended to receive the animal droppings as they fall, without any scooping operation, but the device shown in the Johnson patent would appear to have serious shortcomings, firstly in that it requires operation by two hands, making the simultaneous control of a dog rather difficult, and secondly that it requires a very special design of disposable insert which would be fairly expensive to manufacture.

An object of the present invention is to provide a device which can be used to retrieve dog stool in a simple and effective way, which does not require frequent cleaning, and is fairly cheap to manufacture. More specifically, the invention provides a device which can be operated by only one hand while the dog owner controls the dog with the other hand, which can be used to receive dog stool before it touches the ground, and which uses cheap disposable inserts to receive the stool which do not have to be specially designed for this purpose.

In accordance with one aspect of this invention, a portable sanitation device comprises holder means for a disposable bag, in which the holder means comprises an annular member having an upper rim over which may be folded the flexible edge portion of a disposable bag the main part of which bag extends within the annular member, the annular member having an axial length considerably less than its diameter. The device also includes a long handle fixed to one side of the annular member and extending away therefrom upwardly with respect to the rim (i.e., at the same side of the annular member as the rim) and at a small angle to the axis of the annular member, and a lid pivotally connected to the annular member for movement between a closed position over the upper rim in which it forms a closure with the bag, and an open position in which the lid is well clear of the rim.

The term "long handle" means an elongated handle or stick which is sufficiently long that a person standing upright and holding the end of the handle can place the bag holder means against the ground. The "small angle" referred to should preferably be of the order of 20°, although it may be any angle less that say 45°. The open position of the lid, in which it is well clear of the upper rim, is such that with the lid open the bag holder means can be positioned to receive the stool from a dog without the lid coming into contact with the dog or interferring with the use of the device.

Preferably, the holder means are designed to be used with a simple plastic bag having a plain outer edge portion without any special draw-string or other adaptation. For this purpose, the upper rim of the annular member preferably provides a continuous outwardly facing surface around the top end of the annular member and the device also has retaining means for holding the outer edge portion of the bag against this surface. The retaining means is preferably an extensible element having one end fixed to the annular member and having a free end carrying fixing means capable of cooperating with catch means carried by the annular member when the extensible element is stretched around the folded over edge portion of the bag.

The annular member is preferably in the form of a short tube having an axial length which, while considerably less than its diameter, is at least 1 inch, and preferably of the order of 2 inches, so that the bottom rim of the tube may be rested on the ground without causing complete collapse of the bag. The diameter of the tube will be several times its length.

The lid is preferably freely hinged, and arranged in such a way that the lid can be opened simply by a flicking motion of the handle, or by suitably tilting the device, and closed in similar manner.

The invention will now be described by way of example with reference to the accompanying drawings, in which.

Figure 1:
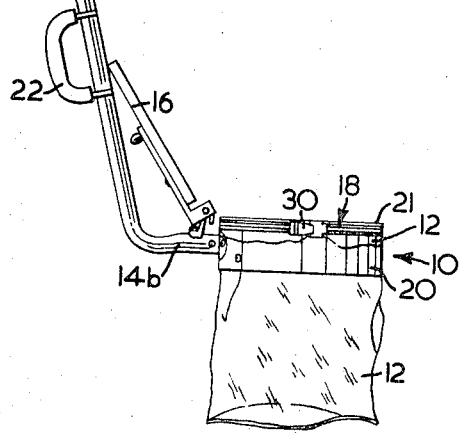
FIG. 1 shows a side view of one form of the device with the lid open.

Referring to FIG. 1 of the drawings, the device consists basically of holder means 10 for a disposable bag 12, the holder means being connected to a long handle 14, and provided with a hinged lid 16. The main part of the holder means 10 is an annular member in the form of a short tube 20 formed from a cylindrically curved sheet of metal which is open at both ends. The metal is preferably aluminium. The size of the holder means will naturally vary with the size of dog or other animal with which the device is to be used, but for large dogs a suitable diameter of the holder means is 5 ½ inches, and a suitable axial length is 2 inches. The holder means has an upper rim 21 providing a continuous outwardly facing cylindrical surface, and the device also includes retaining means indicated generally at 18 for holding the outer edge portion of the bag 12 against this surface.

The handle 14 is formed of aluminium tubing of about 1 inch diameter, and has a main portion 14a about 28 inches long which extends at a small angle of about 20° to the axis of the holder means 10, the handle extending upwardly with respect to the upper rim of the tube 20. The handle is connected to the holder means by a lower portion 14b extending perpendicularly to the axis of the holder means and having a flanged end piece rivetted to the side of tube 20, the handle meeting the tube 20 sufficiently below the upper rim so as not to obstruct the cylindrical surface underneath the retaining means 18. The long handle 14 is provided with an additional carrying hand grip 22 which is useful for carrying the device when not in use, and which is near to the balance point of the device.

Figure 2:
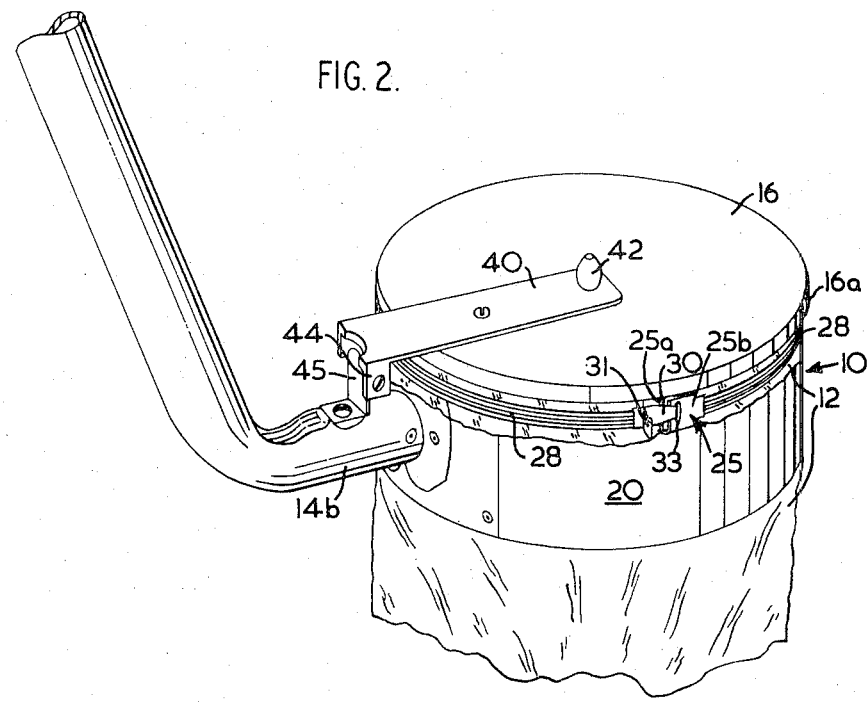
FIG. 2 shows a perspective view of a part of the same device with the lid closed.
Figure 3:
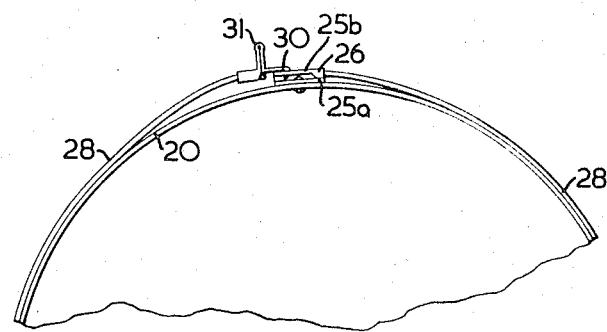
FIG. 3 shows a plan view of a portion of the device with the lid open.

The retaining means 18 are more clearly shown in FIGS. 2 and 3. As shown, one side of the rim 21 of the holder means is provided with a U-shaped metal bracket 25 open at its top side and having an inner flange 25a rivetted to the tube 20 and having an outer flange 25b spaced away from flange 25a to enable a folded over edge portion of the bag 12 to be inserted under the flange 25b. One lateral side of flange 25b has bent over lugs 26 which fix in position one end of an elastic strap 28. The free end of strap 28 carries fixing means in the form of a sheet metal hook 30, the metal forming the hook also forming an outwardly projecting finger grip 31 by means of which the hook can be manipulated. The flange 25b is provided with a vertical slot 33 into which the end of hook 30 can be inserted to hold the strap 28 stretched around the outer edge portion of the bag 12.

The lid 16 is of sheet metal, having a downwardly directed flange 16a into which is fitted an annular rubber sealing strip which fits closely over the upper rim of the plastic bag 12 the edges of which are folded over the rim of the holder means as described. When closed, the lid forms a closure with the bag to minimize the odours from the matter therein. The lid is mounted on a pivot arm 40 by means of a nut and bolt arrangement in the centre of the lid which also includes a combined metal weight and finger grip 42. The pivot arm 40 has two depending lugs 44 at its outer end, which lugs are pivotally connected to a bracket 45 attached to the lower handle portion 14b near its junction with the holder means. The arm 40, and with it the lid 16, is free to pivot on the bracket 45. Also, the bracket 45 is so positioned that with the device held in the operative position in which the axis of the holder means is vertical (as in FIG. 1), the lid is held by gravity in its open position. It will be seen from FIG. 1 that is this position the lid is well clear of the opening into the bag.

The nature of the pivotal connection between the bracket 45 and arm 40, taken together with the weight of the lid including that of finger grip 42, and also the nature of the fit of the lid over the bag, are all designed so that the lid is quite free to move between the open and close positions. The design is such that the lid can be opened merely by tilting the device in the anti-clockwise position from that shown in FIG. 1, or more simply merely by giving a slight flicking movement to the handle while the device is in the general position shown in FIG. 1. The lid may be closed by a reverse flicking movement, or preferably by tilting the device sideways as by rotating the handle about its axis from the position shown in FIG. 1. Thus, the lid can be opened and closed very simply by a person holding the handle with only one hand.

Before use, the hook 30 is removed from the slot 33 to release the strap 28, and a plastic bag 12 is positioned within the holder means and the outer edge portion 12a of the bag is folded over the cylindrical outer surface of the rim portion 21. The bag is then secured in position by stretching the strap 28 around the edge portion 12a of the bag, and positioning the hook 30 in slot 33 as shown. The bag 12 is preferably a generally tubular bag of dark flexible plastic material, such as is used for garbage bags, having a sealed lower end. Suitable plastic bags are readily available, and it should be noted that there is no need for the bag to have any very special shape, nor to be of any precise size so long as its edges can be folded over the rim of the holder means.

With the bag 12 in place, the device may be carried preferably by handle grip 22, by a person walking his dog. When the dog indicates by its characteristic behavior that it is about to excrete, the device will be held by the upper end of the handle 14, and the lid 16 opened by suitable flicking movement, the holder means being then positioned suitably at the rear end of the dog. The holder means may be held slightly above the ground, or even rested upon the ground, the axial dimension of tube 20 being such that the bag will not be completely collapsed in the latter case. When the dog has performed, the lid will be closed by the tilting motion described, and the device carried back to the owner's home. The device can easily be used more than once, should a dog repeat himself, and can be used with more than one dog. On reaching home, the owner can easily dispose of the plastic bag in a suitable garbage container or other disposal place by opening the lid while the device is being held over such container, etc., and releasing the hook 30 by grasping the finger grip 31, to release the strap 28 and allow the bag to fall from the holder means.

It will be apparent that the folded over edge portions of the plastic bag protect the holder means from contact with any of the fecal matter, and also that it is possible to release the bag and deposit this in a garbage container without touching the bag by hand. The device is also easy to use, requires only one hand in operation, and does not leave any stool on the ground. The construction of the device is relatively simple, and the device does not require any special form of disposable insert.

Figure 4:
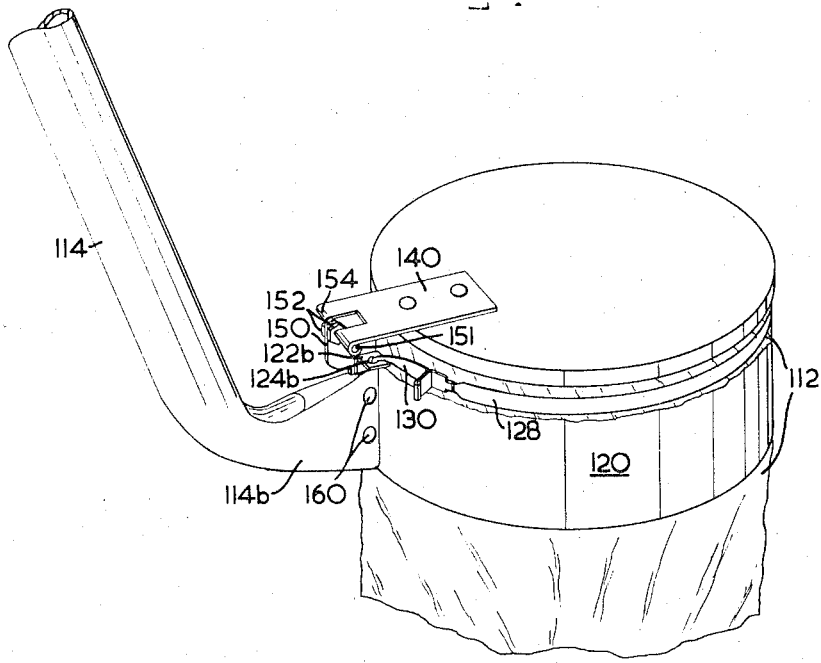
FIG. 4 shows a perspective view of a second embodiment of the device.
Figure 5:
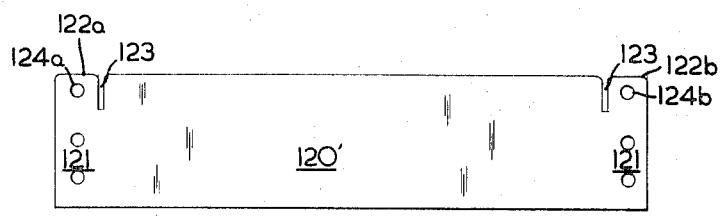
FIG. 5 shows a metal blank used to form a main part of the embodiment of FIG. 4.

The modified form of the device shown in FIGS. 4 and 5 is similar in nature to that previously described, although simpler to make and to use.

In the device shown in FIG. 4, the holder means 120 is formed from a strip of metal shown as a blank in FIG. 5. The major, central portion 120' of the strip is bent around to form a cylinder, and the strip has two adjacent end portions 121 (shown in FIG. 5 but hidden in FIG. 4) bent radially outwardly to form flanges to which the handle 114 is connected. For this purpose, the lower end 114b of the tubular handle is split by vertical slits through its upper and lower walls, and is then flattened to from a flat, vertical, bifurcated end portion, the two side walls of which embrace the flanges 121. In addition, a metal plate 150 has a lower portion held between these flanges 121, and the upper part of the plate 150 carries a cross-shaft 151 secured by nuts 152, on which shaft the curled over end parts 154 of the lid pivot arm 140 is mounted. The handle end portion 114b is secured to the flanges 121 and to plate 150 by rivets 160. The upper ends of the flanges 121 are separated from the main portion 120' of the strip by slits 123, and are bent outwardly to extend horizontally away from each other to form brackets 122 integral with the flanges 121 and which mount the retaining means for the bag. One end of the extensible strip 128 forming the retaining means is attached to aperture 124a in one of the brackets 122a, and the other end carries fixing means in the form of a metal hook 130 which is engageable in aperture 124b of the other bracket 122b. With the hook in place as shown, the retaining strip 128 is stretched around the outer surface of the rim of cylinder 120, and is capable of retaining the folded over end portion of a bag 112, as in the first embodiment.

With this modified construction, only two rivets are required for holding together the ends of the metal strip forming cylinder 120 and for securing the handle in place, as well as for mounting the plate 150 carrying the lid pivot arm 140. Also, no additional fixtures are required for holding the ends of the retaining means, these being carried by the brackets 122 which are merely bent over top portions of the flanges 121.

This modified construction is also easier to use than that previously described, since, with brackets 122a and 122b on opposite sides of the handle, there is no problem of threading the strip 128 through the space between the lid pivot and the cylinder, which problem arises with the first embodiment if strip 28 becomes misplaced.

I claim:
1. A portable sanitation device comprising:
a. holder means for a disposable bag, said holder means comprising a strip of metal the major portion of which is bent to form a hollow, open-ended cylinder having a continuous upstanding upper rim suitable for receiving the folded-over edge portion of a disposable bag, said cylinder having an axial length considerably less than its diameter, and the end portions of said strip forming flanges projecting radially from the cylinder;
b. a long handle having a flattened end portion secured to said flanges and extending away therefrom upwardly with respect to said upper rim and at a small angle to the axis of the cylinder,
c. a lid pivotally connected to said end flanges for movement between a closed position over said rim and forming a closure with said bag, and an open position in which the lid is well clear of said upper rim, and
d. retaining means for holding the outer edge portion of the bag against the outer surface of said rim, said retaining means comprising an extensible element having one end fixed to a first bracket connected to said flanges and having a free end carrying fixing means capable of co-operating with catch means provided by a second bracket also connected to said end flanges, said brackets being on opposite sides of the said flattened end of the handle and being spaced away from the outer surface of the cylinder to enable a folded-over edge portion of a bag to be inserted therebetween.

2. The device of claim 1, wherein said brackets are integral with said flanges and are constituted by folded out top portions of said flanges which top portions are separated from the main portion of the strip forming the cylinder.

3. A portable sanitation device comprising:
a. holder means for a disposable bag, said holder means comprising an open ended annular member having an axial length considerably less than its diameter and having an upper rim providing a continuous outwardly facing surface around the top end of the annular member and suitable for receiving the folded over end portion of a disposable bag while the main part of the bag extends within said annular member,
b. retaining means for holding the outer edge portion of the bag against said outwardly facing surface, said retaining means comprising an extensible element having one end fixed to said annular member and having a free end carrying fixing means capable of co-operating with catch means carried by said annular member when said extensible element is stretched around the folded-over edge portion of a disposable bag, said fixed end of the extensible element and said catch means being both carried by bracket means spaced away from the outwardly facing surface to enable a folded over edge portion of a bag to be inserted therebetween, said free end of the extensible element being further provided with hand grip means for locating said fixing means on said catch means with simultaneous stretching of said extensible element around said outwardly facing surface,
c. a long handle fixed to one side of said annular member and extending away therefrom upwardly with respect to said upper rim and at a small angle to the axis of said annular member,
d. a lid pivotally connected to said annular member for movement between a closed position over said upper rim and forming a closure with said bag, and an open position in which the lid is well clear of the said upper rim.

4. A portable sanitation device comprising:
a. holder means for a disposable bag, said holder means comprising an open ended annular member having an axial length considerably less than its diameter and having an upper rim providing a continuous outwardly facing surface around the top end of the annular member and suitable for receiving the folded over end portion of a disposable bag while the main part of the bag extends within said annular member, said annular member comprising a strip of metal the major portion of which is bent to form a cylinder, the end portions of the strip forming flanges projecting outwardly from the cylinder,
b. a long handle fixed to said flanges and extending away from said cylinder upwardly with respect to said upper rim and at a small angle to the axis of said cylinder, and
c. a lid pivotally connected to said flanges and movable between a closed position over said upper rim and forming a closure with said bag, and an open position in which the lid is well clear of the said upper rim.

* * * * *